(12) United States Patent
Mukherjee

(10) Patent No.: US 10,405,263 B2
(45) Date of Patent: Sep. 3, 2019

(54) PRIVATE RADIO NETWORKS

(71) Applicant: Verizon Patent and Licensing Inc., Arlington, VA (US)

(72) Inventor: Amitav Mukherjee, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 40 days.

(21) Appl. No.: 15/888,506

(22) Filed: Feb. 5, 2018

(65) Prior Publication Data
US 2019/0246335 A1 Aug. 8, 2019

(51) Int. Cl.
*H04W 48/08* (2009.01)
*H04W 12/08* (2009.01)
*H04W 16/28* (2009.01)
*H04W 72/04* (2009.01)
*H04W 60/04* (2009.01)
(Continued)

(52) U.S. Cl.
CPC ............ *H04W 48/08* (2013.01); *H04L 63/10* (2013.01); *H04W 12/0806* (2019.01); *H04W 16/28* (2013.01); *H04W 60/04* (2013.01); *H04W 72/046* (2013.01); *H04W 16/14* (2013.01); *H04W 16/16* (2013.01); *H04W 56/001* (2013.01); *H04W 74/0808* (2013.01); *H04W 84/045* (2013.01); *H04W 84/105* (2013.01); *H04W 84/16* (2013.01); *H04W 88/08* (2013.01)

(58) Field of Classification Search
CPC ... H04W 48/08; H04W 60/04; H04W 72/046; H04W 16/14; H04W 16/16; H04W 16/28; H04W 56/001; H04W 74/0808; H04W 88/08; H04W 12/08–0808; H04W 84/045; H04W 84/105; H04W 84/16; H04L 63/10
See application file for complete search history.

(56) References Cited

U.S. PATENT DOCUMENTS

2009/0088135 A1* 4/2009 Kekki ................. H04L 63/10
  455/411
2015/0281966 A1* 10/2015 Griot .................. H04W 12/08
  726/5
(Continued)

OTHER PUBLICATIONS

3GPP TS 38.300 V2.0.0, "3rd Generation Partnership Project; Technical Specification Group Radio Access Network; NR; NR and NG-RAN Overall Description; Stage 2 (Rel. 15)", Dec. 2017 (Year: 2017).*
(Continued)

*Primary Examiner* — Joshua Kading

(57) ABSTRACT

Systems and methods described herein utilize 5G New Radio (NR) radio access network (RAN) architecture and NR capabilities to realize private NR networks. The private NR networks can operate in unlicensed or shared radio frequency (RF) spectrum using 5G NR standards. A base station stores a private network identifier for a private NR RAN. The base station transmits the private network identifier within remaining minimum system information (RMSI) or other system information (OSI) on a shared downlink channel. The private network identifier indicates support of private network operations for the private NR RAN by the base station. The base station receives, in response to transmitting the private network identifier, an attach request from an end device that is provisioned for access to the private NR RAN.

20 Claims, 8 Drawing Sheets

(51) Int. Cl.
*H04L 29/06* (2006.01)
*H04W 16/16* (2009.01)
*H04W 16/14* (2009.01)
*H04W 88/08* (2009.01)
*H04W 74/08* (2009.01)
*H04W 56/00* (2009.01)
*H04W 84/04* (2009.01)
*H04W 84/10* (2009.01)
*H04W 84/16* (2009.01)

(56) References Cited

U.S. PATENT DOCUMENTS

2016/0174285 A1* 6/2016 Ke ........................ H04W 8/06
 370/329
2018/0310238 A1* 10/2018 Opsenica ............. H04W 12/06

OTHER PUBLICATIONS

Samsung, "Remaining Minimum System Information delivery", 3GPP TSG RAN WG1 NR Ad-Hoc#2, R1-1710630, Jun. 30, 2017 (Year: 2017).*
Industrial Technology Research Institute, "3GPP New Radio Ran1", Feb. 24, 2017 (Year: 2017).*
Campos, Javier, "Understanding the 5G NR Physical Layer", Keysight Technologies, Nov. 1, 2017 (Year: 2017).*

* cited by examiner

PRIVATE RADIO NETWORKS

BACKGROUND

A promising trend in wireless connectivity uses private networks where radio access network (RAN) and evolved packet core (EPC) components are deployed and managed on-location at private enterprise sites with minimal mobile network operator (MNO) assistance.

DETAILED DESCRIPTION OF THE PREFERRED EMBODIMENTS

The following detailed description refers to the accompanying drawings. The same reference numbers in different drawings may identify the same or similar elements.

Private networks using wireless standards are a promising new connectivity model. Focus in the industry has gravitated toward using existing broadband cellular network standards, such as Long Term Evolution (LTE) standards, that can potentially be used in unlicensed or shared radio frequency (RF) spectrum. The low transmit power required for signals in unlicensed or shared spectrum permits relatively dense placement of small private network cells. The 5G NR air interface is significantly different from the standardized LTE interface (and other legacy interfaces). Therefore, new design solutions are required to realize private 5G NR networks.

Implementations described herein utilize NR radio access network (RAN) architecture and NR capabilities, such as advanced beamforming, to realize private NR networks. Implementations described herein further describe operation of private NR networks in unlicensed and shared spectrum and self-organizing network (SON) aspects.

Figure 1:
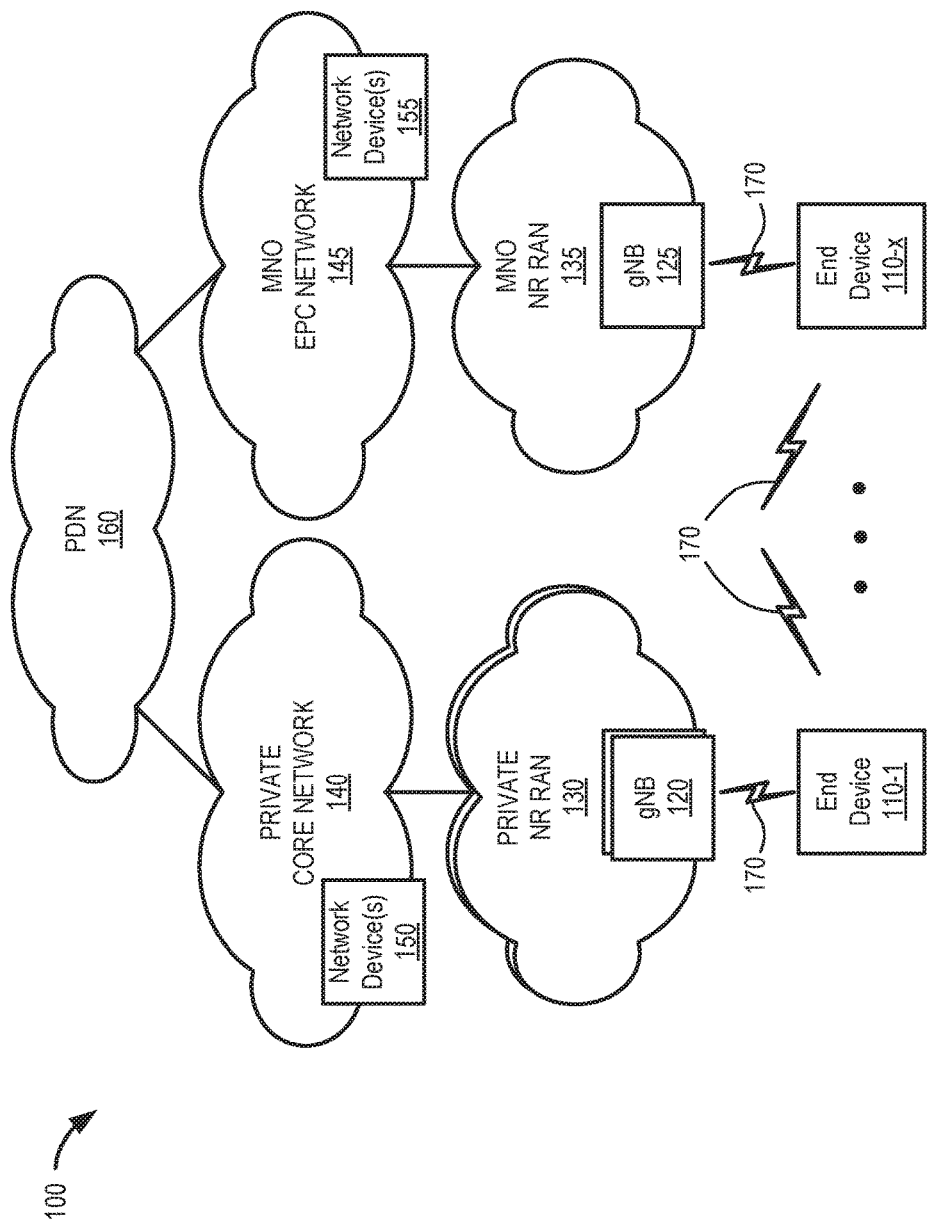
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include end devices 110-1 through 110-x (also referred to collectively as end devices 110 and, individually or generally as end device 110), one or more next generation Node Bs (referred to herein as a "gNB") 120 for a private NR RAN 130, a gNB 125 for a mobile network operator (MNO) NR RAN 135, a private core network 140 with network devices 150, an MNO evolved packet core (EPC) network 145 with network devices 155, and a packet data network (PDN) 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary. In the configuration of FIG. 1, end devices 110 may use a wireless channel 170 to access gNB 120 and/or gNB 125. Wireless channel 170 may correspond, for example, to physical layer protocols in accordance with 5G New Radio standards (e.g., 3GPP standards for 5G air interfaces, etc.). As described further herein, wireless channel 170 may be used to broadcast signals differentiating private NR RAN 130 from MNO NR RAN 135.

The number and arrangement of devices in environment 100 are exemplary. According to other embodiments, environment 100 may include additional devices and/or differently arranged devices, than those illustrated in FIG. 1. The number and arrangement of networks in environment 100 are exemplary. According to other embodiments, environment 100 may include additional networks, fewer networks, and/or differently arranged networks than those illustrated in FIG. 1.

End device 110 may include any type of mobile device having multiple coverage mode capabilities, and thus communicate with the appropriate gNB 120/125 using a variety of different wireless channels (e.g., channels 170) corresponding to the different RANs (e.g., RANs 125 and 135). End device 110 may be a mobile device that may include, for example, a cellular radiotelephone, a smart phone, a tablet, a set-top box (STB), a mobile phone, any type of internet protocol (IP) communications device, a Voice over Internet Protocol (VoIP) device, a laptop computer, a palmtop computer, a wearable computer, a gaming device, a media player device, or a digital camera that includes communication capabilities (e.g., wireless communication mechanisms such as Wi-Fi). According to implementations described herein, end device 110 may be provisioned (e.g., via a SIM card, eUICC, or another secure element) to recognize particular private network identifiers (e.g., associated with private NR RAN 130) and/or MNO identifiers (e.g., associated with MNO NR RAN 135). In various embodiments, the wireless channels 170 may be supported by any appropriate cellular RAN, such as, for example, private NR RAN 130 and/or MNO NR RAN 135. Identification of a private network by a private end device 110 is based on detection of a pre-specified private network identifier broadcast by a private (or semi-private) gNB 120.

gNB 120 (also referred to herein simply as a base station) may include a transceiver system that connects end devices 110 to other components of private NR RAN 130 and private core network 140 using wireless interfaces. Each gNB 120 may include an antenna array, transceiver circuitry, and other hardware and software components for enabling end devices 110 to wirelessly transmit data to a respective gNB 120, and to wirelessly receive data from a respective gNB 120. Each gNB 120 connects to other components of private NR RAN 130 and private core network 140 such that data received from a source end device 110 may be forwarded towards its destination in PDN 160, or data received from a source in PDN 160 may be forwarded to a destination end device 110. In contrast with omnidirectional broadcasts used in legacy base stations, gNB 120 may broadcast different radio frequency (RF) beams in spatially different directions. As described further herein, beamforming of RF signals may be used to allow gNB 120 to support access to different private networks on different frequencies at the same time. For example, gNB 120 may broadcast downlink beams that include different private network identifiers. In another example, gNB 120 may broadcast a prioritized list containing different private network identifiers and access restrictions for end devices 110 corresponding to different private network identifiers. As described further herein, gNB 120 may encode and broadcast the private network identifiers and related access information using downlink channels unique to 5G NR RANs.

gNB 125 may include a transceiver system that connects end devices 110 to other components of private MNO NR RAN 135 and MNO EPC network 145 using wireless interfaces. Each gNB 125 may include an antenna array, transceiver circuitry, and other hardware and software components for enabling end devices 110 to wirelessly transmit data to a respective gNB 125, and to wirelessly receive data from a respective gNB 125. Each gNB 125 connects to other components of MNO NR RAN 135 and MNO EPC network 145 such that data received from a source end device 110 may be forwarded towards its destination in PDN 160, or data received from a source in PDN 160 may be forwarded to a destination end device 110. Similar to gNB 120, gNB 125 may use beamforming to broadcast different RF signals in spatially different directions.

Private core network 140 includes one or multiple networks of one or multiple types serviced by a private or government enterprise other than an MNO (e.g., for employees, customers, selected users, etc.). According to an exemplary implementation, private core network 140 may include a complementary network pertaining to private NR RAN 130. For example, private core network 140 may include a core part of a private next generation wireless network. Private core network 140 may include various types of network devices 150, such as, for example, a gateway device, a support node, a serving node, a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of private core network 140.

MNO EPC network 145 includes one or multiple networks of one or multiple types serviced by a mobile network operator for public subscribers. According to an exemplary implementation, MNO EPC network 145 may include a complementary network pertaining to MNO NR RAN 135. For example, MNO EPC network 145 may include a core part of a next generation wireless network (e.g., a 5G core network, etc.). MNO EPC network 145 may include various types of network devices 155, such as, for example, a gateway device, a support node, a serving node, a core access and mobility management function (AMF), a session management function (SMF), a policy control function (PCF), as well other network devices that provide various network-related functions and/or services, such as charging and billing, security, authentication and authorization, network policy enforcement, management of subscriber profiles, and/or other functions and/or services that facilitate the operation of the core network.

PDN 160 may include one or more networks, such as a local area network (LAN), a wide area network (WAN), a metropolitan area network (MAN), a telephone network, the Internet, etc., capable of communicating with end devices 110. In one implementation, PDN 160 includes a network that provides data services (e.g., via packets or any other Internet protocol (IP) datagrams).

For synchronization and system information broadcast, current 5G NR standards implement a synchronization sequence block (SSB) that includes a periodically transmitted primary synchronization signal (NR-PSS), a secondary synchronization signal (NR-SSS), and physical broadcast channel (NR-PBCH) signal. The NR-PBCH signal includes a master information block (MIB) that provides a part of the information needed for initial cell access. The MIB also contains scheduling information for the remaining minimum system information (RMSI). Both RMSI and other system information (OSI) are transmitted on the new radio physical downlink shared channel (NR-PDSCH). A NR gNB (e.g., gNB 120 and gNB 125) transmits multiple SSBs in a SS burst set, where each SSB is associated with a particular beamforming direction.

Figure 2:
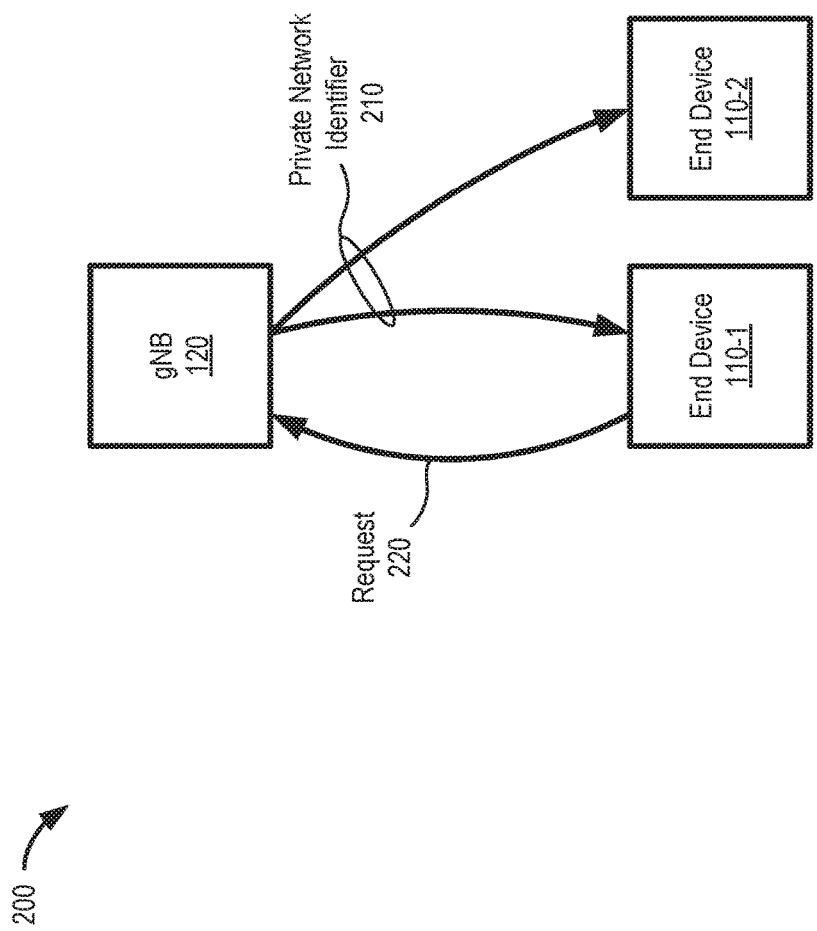
FIG. 2 is a diagram illustrating exemplary communications for signaling a private new radio (NR) radio access network (RAN) in a portion of the network environment of FIG. 1.

FIG. 2 is a diagram illustrating exemplary communications for signaling a private NR RAN in a portion 200 of network environment 100. Network portion 200 may include gNB 120 and end devices 110.

As shown in FIG. 2, gNB 120 may broadcast one or more fields that indicate the support of private network operation, as well as identifiers for the specific private networks that are supported. A private network identifier 210 may include, for example, a dedicated public land mobile network (PLMN) ID, physical cell identifier (PCI), or closed subscriber group (CSG) ID, or another type of identifier. As used herein, the term "private network identifier" may include collectively both a unique network identifier and an indication of the support of private network operation by gNB 120. In one implementation, gNB 120 may repeatedly transmit signals (e.g., downlink synchronization signals) which include private network identifier 210 in each individual downlink beam supported by gNB 120. End devices 110 may receive and decode the signals to identify private network identifier 210. If provisioned to access private NR RAN 130, an end device 110 (e.g., end device 110-1) may use private network identifier 210 to provide a request 220 for enabling an attachment procedure to private NR RAN 130. Request 220 may include a random access preamble (RAP), random access channel (RACH) preamble, etc.

Figure 3:
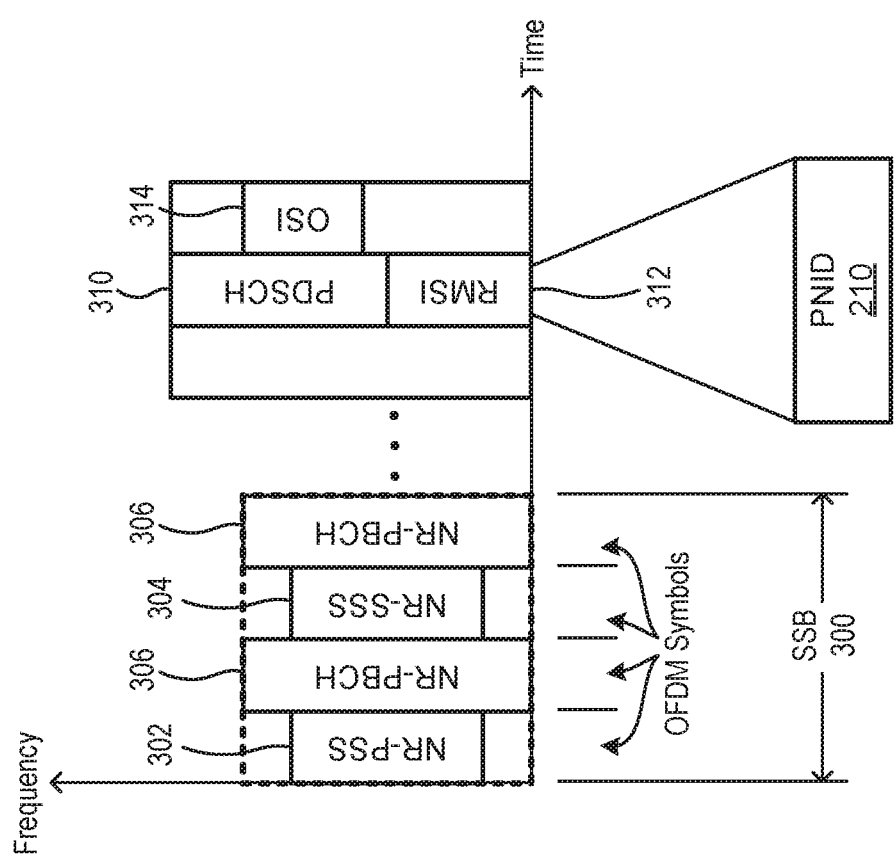
FIG. 3 is a schematic of downlink synchronization signals transmitted by a gNB of FIG. 1, according to an implementation described herein.

FIG. 3 is a simplified schematic of downlink synchronization signals that includes an orthogonal frequency-division multiplexing OFDM symbol synchronization sequence block (SSB) 300 and a new radio physical downlink shared channel (NR-PDSCH) 310, according to an implementation described herein. Referring collectively to FIGS. 2 and 3, gNB 120 may broadcast SSB 300 on each individual downlink beam supported by gNB 120. SSB 300 may include a periodically transmitted primary synchronization signal (NR-PSS) 302, a secondary synchronization signal (NR-SSS) 306, and physical broadcast channel (NR-PBCH) signal 306, and a duplicate NR-PBCH 306. The NR-PBCH includes a master information block (MIB) that points to other system information outside of SSB 300. gNB 120 also may broadcast remaining minimum system information (RMSI) 312 or other system information (OSI) 314 on NR-PDSCH 310 on each individual downlink beam supported by gNB 120.

End device 110 may receive SSB 300 broadcast from gNB 120 and detect NR-PBCH 310. NR-PBCH 310 will inform end device 110 where (e.g., in an OFDM time domain) to find RMSI 312 and OSI 314. End device 110 will read the RMSI 312 and OSI 314, which collectively include information and parameters for end device 110 to access gNB 120. One field included in RMSI 312 or OSI 314 is the private network identifier 210, along with information for how end device 110 can access the private network (private NR RAN 130).

According to implementations described herein, the private network identifier 210 may be included within RMSI 312 (as shown in FIG. 3) or OSI 314 that is transmitted on NR-PDSCH 310. End devices 110 that are configured/provisioned to detect the private network identifier 210 may use private network identifier 210 to attach to the corresponding private network (e.g., private NR RAN 130) instead of an MNO network or another default network, such as MNO NR RAN 135.

Figure 4:
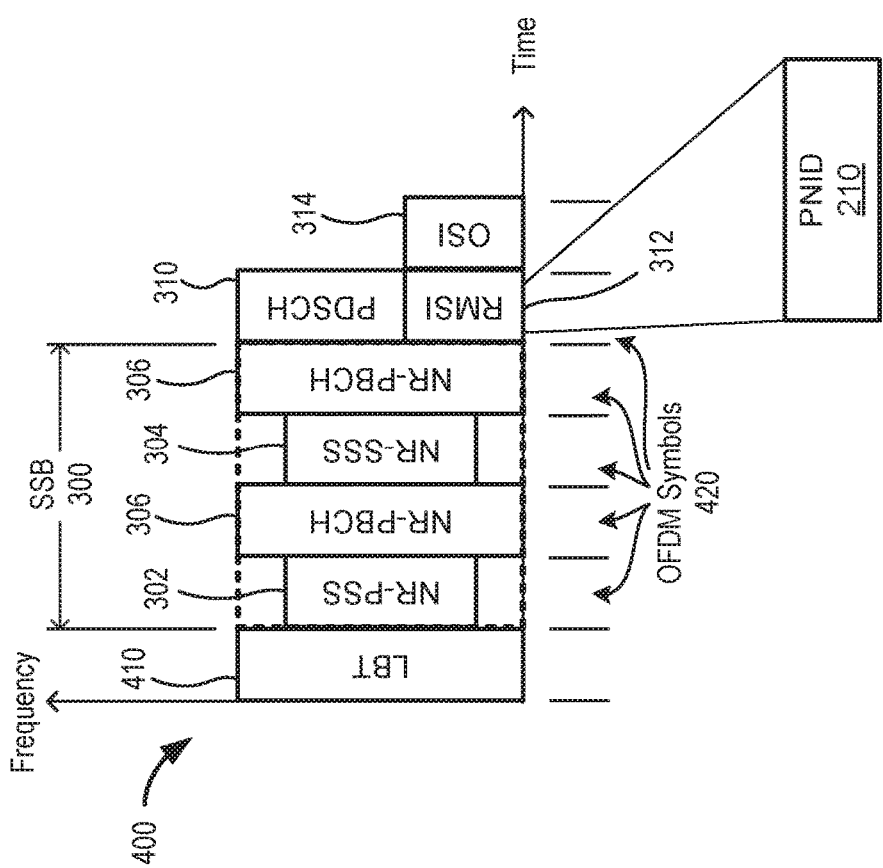
FIG. 4 is a schematic of a synchronization sequence block (SSB) burst set, according to an implementation described herein.

FIG. 4 is a schematic of an SS burst set 400, according to an implementation described herein. For operation in unlicensed or shared spectrum (e.g., including, but not limited to, 5 GHz, 3.5 GHz, and 60 GHz frequencies), SS burst set 400 employs a listen-before-talk (LBT) time slot 410 preceding SSB 300. LBT procedures may be performed by gNB 120 before gNB 120 can access a shared channel. For example, gNB 120 listens during the symbol time of LBT time slot 410 to ensure a shared channel is not being used by another network device before transmitting.

After performing the LBT procedure (e.g., and determining that a channel is available), gNB 120 may transmit SS burst set 400 including containing one or more SSBs 300, the RMSI 312, the OSI 314, PDSCH signal 310, and a physical downlink control channel (PDCCH) of the private gNB (e.g., gNB 120) contiguously in the time domain over consecutive OFDM symbols (e.g., OFDM symbols 420). Contiguous transmission of the SS burst set 400 minimizes time-domain gaps between SSB 300, RMSI 312, OSI 314, etc., and limits the number of any applicable listen-before-talk (LBT) procedures needed to access the channel.

Figure 5:
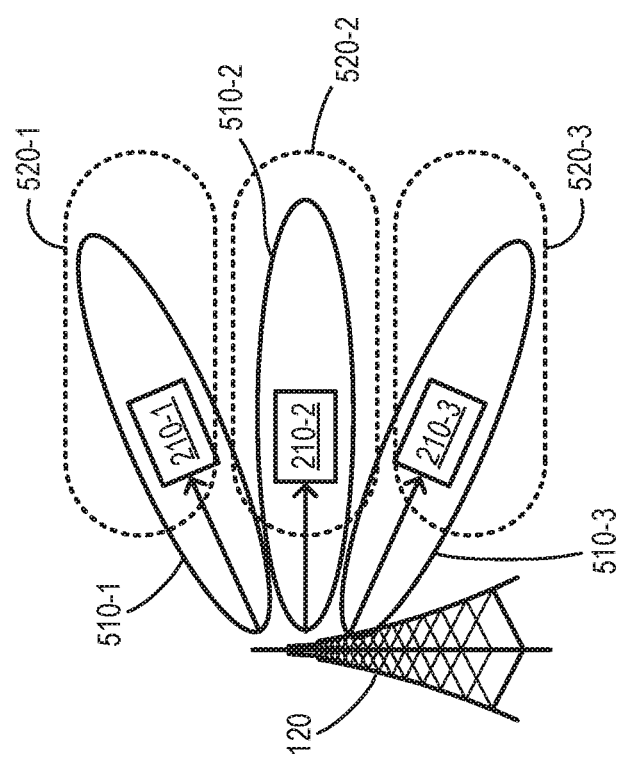
FIG. 5 is a schematic illustrating spatial separation of adjacent private network service areas, according to an implementation described herein.

FIG. 5 is a diagram schematically illustrating spatial separation of adjacent private network service areas, according to an implementation described herein. As shown in FIG. 5, gNB 120 may utilize different downlink (DL) beams 510-1, 510-2, and 510-3 for different service areas serviced by gNB 120. Each downlink beam 510 may include a unique SSB 300 (not shown in FIG. 5). According to an implementation, gNB 120 also may simultaneously broadcast different private network IDs 210 per beamforming direction or SSB 300. In other words, the SS burst set may encompass a plurality of private network IDs 210-1 through 210-3, where each private network ID 210 is associated with a particular downlink beam 510. Use of different private network IDs 210 with different downlink beams 510 enables spatial separation of adjacent private network service areas 520. End devices 110 may be provisioned to recognize one or more private network IDs 210 (e.g., associated with a particular enterprise, employer, network owner, etc.).

Thus, in one aspect, different private network owners (e.g., enterprises, companies, etc.) may use the same gNB 120 for distinct private networks in different service areas 520. For example, one gNB 120 may support access to different private networks (e.g., different private NR RANs 130 with different private network IDs 210) for different companies on different floors (e.g., different service areas 520) of an office building. As another example, some different downlink beams 510 (e.g., for a company with offices on two floors) may provide the same private network IDs 210, and end devices 110 may select the downlink beam 510 with the higher signal quality for attachment.

While three downlink beams 510 and three private network IDs 210 are illustrated in FIG. 5 for simplicity, more or fewer downlink beams 510 and private network IDs 210 may be used with a single gNB 120 in other implementations. Furthermore, the number of downlink beams 510 and the number of private network IDs 210 may be different. For example, two or more downlink beams 510 may be used for the same private network ID 210 in some implementations.

According to another implementation, although different private network IDs 210 may be indicated on different beams 510, beams 510 may all correspond to a common random access channel (RACH) resource to be used for initial access. Thus, gNB 120 may use multiple beams for downlink broadcast channels and a common beam for uplink signals (e.g., initial access signals or data uplink signals) from different private networks. For example, an SSB 300 in beam 510-1 may point to private network ID 210-1 (e.g., in a corresponding RMSI 312) and another SSB 300 in beam 510-2 may point to private network ID 210-2 (e.g., in another corresponding RMSI 312). Both SSBs 300, however, may point to use of a common uplink resource (e.g., particular spatial direction and a time/frequency resource allocation) to be used by all end devices 110 in service areas 520-1 and 520-2. The common uplink resource may be indicated, for example, in a physical random access channel (PRACH) indicated by PBCH 306, RMSI 312, OSI 314, etc. Use of a common beam for uplink signals may improve efficiency of the radio resources.

In another aspect, gNB 120 may service both private NR RAN 130 and MNO NR RAN 135. In one implementation, gNB 120 may indicate different radio resources, such as RACH and random access response (RAR) resources, in the PBCH 306, RMSI 312, and/or OSI 314 for use by private end devices 110 (e.g., end devices 110 that are provisioned for private NR RAN 130) or public end devices 110 (e.g., end devices 110 that are provisioned for MNO NR RAN 135), in order to differentiate between end device 110 categories in terms of radio resources.

Figure 6:
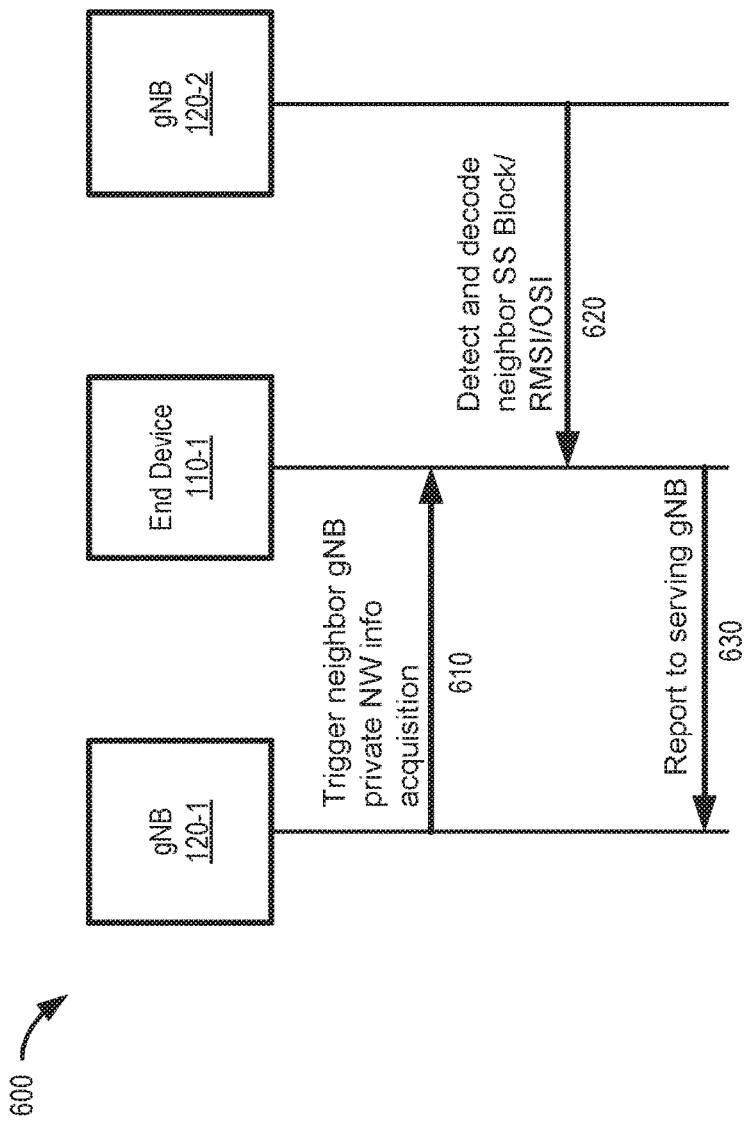
FIG. 6 is a diagram illustrating exemplary communications for obtaining private network information for neighbor gNBs, according to an implementation described herein.

FIG. 6 is a diagram illustrating exemplary communications for obtaining private network information for neighbor gNBs in a portion 600 of network environment 100. Communications in FIG. 6 may relate to communications to support self-organizing network (SON) features for private NR networks.

As a form of SON, the private gNB (e.g., gNB 120-1) may trigger the acquisition and reporting by end devices 110 of information regarding private networks supported by neighbor cells and gNBs 120. This information may be obtained by configuring and ordering end devices 110 to read the SSB 300/RMSI 312/OSI 310 of adjacent gNBs 120 (e.g., gNB 120-2) and to report back any private network information (such as a private network ID 210 associated with gNB 120-2) to the serving gNB (e.g., gNB 120-1). The acquired information may then be broadcast by the serving gNB 120 as described above on connection with, for example, FIGS. 2-4.

As shown in FIG. 6, gNB 120-1 may be a serving gNB for end device 110-1. gNB 120-1 may send to end device 110-1 a signal 610 to trigger acquisition of private network information from neighboring gNBs 120, which may include gNB 120-2. In response to signal 610, end device 110 may detect and decode the SSB 300, RMSI 312, and OSI 314 broadcast by neighbor gNB 120-2, as indicated by reference 620. End device 110-1 may send a report 620 to gNB 120-1 that includes the SSB 300, RMSI 312, and OSI 314 for gNB 120-2. According to an implementation, gNB 120-1 may use report 620 to develop a map (e.g., a spatial map) of neighboring gNBs 120.

Using end devices 110 to collect and distribute private NR network information from neighboring gNBs 120 may allow a serving gNB 120 to collect a private network ID for another gNB 120 that may otherwise be out of listening range. Even when neighboring gNBs are within listening range of each other, using end devices 110 to collect and distribute private NR network information may allow a gNB to collect such information without having to actively listen for neighboring gNBs, as listening for neighboring gNBs 120 may limit other gNB operations during the listening period.

Figure 7:
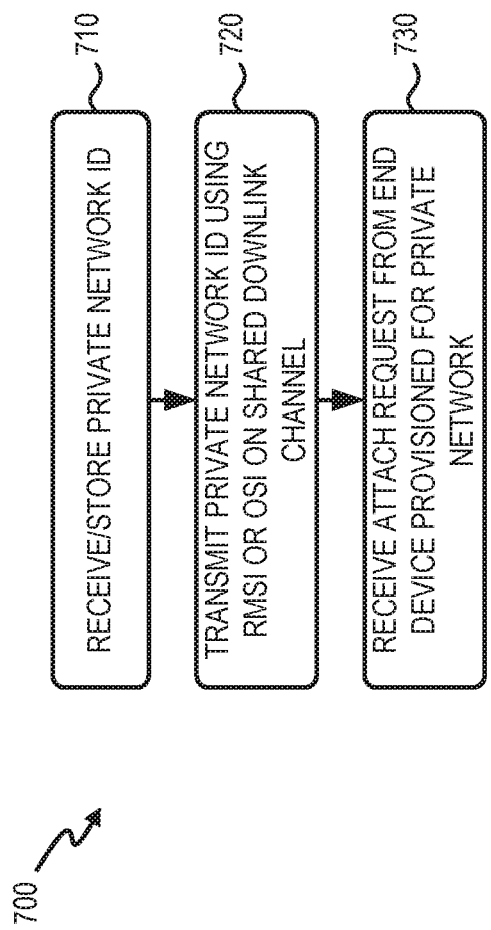
FIG. 7 is a flow diagram illustrating an exemplary process for implementing a private network identifier for a fifth generation (5G) NR RAN, according to an implementation described herein.

FIG. 7 is a flow diagram illustrating an exemplary process 700 for implementing a private network identifier for a 5G NR RAN, according to an implementation described herein. In one implementation, process 700 may be implemented by one or more gNB 120. In another implementation, process 700 may be implemented by gNB 120 in conjunction with one or more other devices in network environment 100.

Referring to FIG. 7, process 700 may include receiving and/or storing a private network identifier (block 710). For example, gNB 120 may be provided with one or more private network identifier, such as a dedicated PLMN ID, PCI, a CSG ID, or another type of unique identifier. The private network identifier may be stored in a local memory (e.g., memory 830 described below) of gNB 120. In some implementations, gNB 120 may store multiple prioritized private network identifiers. In other implementations, the private network identifier may be associated with a particular beam of multiple spatially separate RF beams supported by gNB 120.

Process 700 may also include transmitting the private network identifier using the RMSI or OSI on a shared downlink channel (block 720). For example, gNB 120 may broadcast one or more fields that indicate the support of private network operation, as well as private network identifier 210 for the specific private network(s) that are supported. In one implementation, gNB 120 may broadcast different radio frequency (RF) beams in spatially different directions, with each beam providing a different private network identifier 210. For example, for each beam, gNB 120 may transmit an SSB that includes NR-PSS 302, NR-SSS 304, and NR-PBCH signal 306. NR-PBCH signal 306 may include an MIB that contains scheduling information for RMSI 312 and/or OSI 314. Both RMSI 312 and OSI 314 may be transmitted on NR-PDSCH 310. One or more private network identifiers 210 may be included within each RMSI 312 or OSI 314 for each beam.

Process 700 may also include receiving an attach request from an end device 110 that is provisioned for the private network (block 730). For example, end device 110-1 may be provisioned to use a private network (e.g., private NR RAN 130, private core network 140, etc.) associated with private network identifier 210. End device 110-1 may detect and decode private network identifier 210 within RMSI 312 or OSI 314 and determine, based on private network identifier 210, that gNB 120 supports private network operations. End device 110-1 may then provide a request (e.g., request 220) for attachment to private NR RAN 130.

Figure 8:
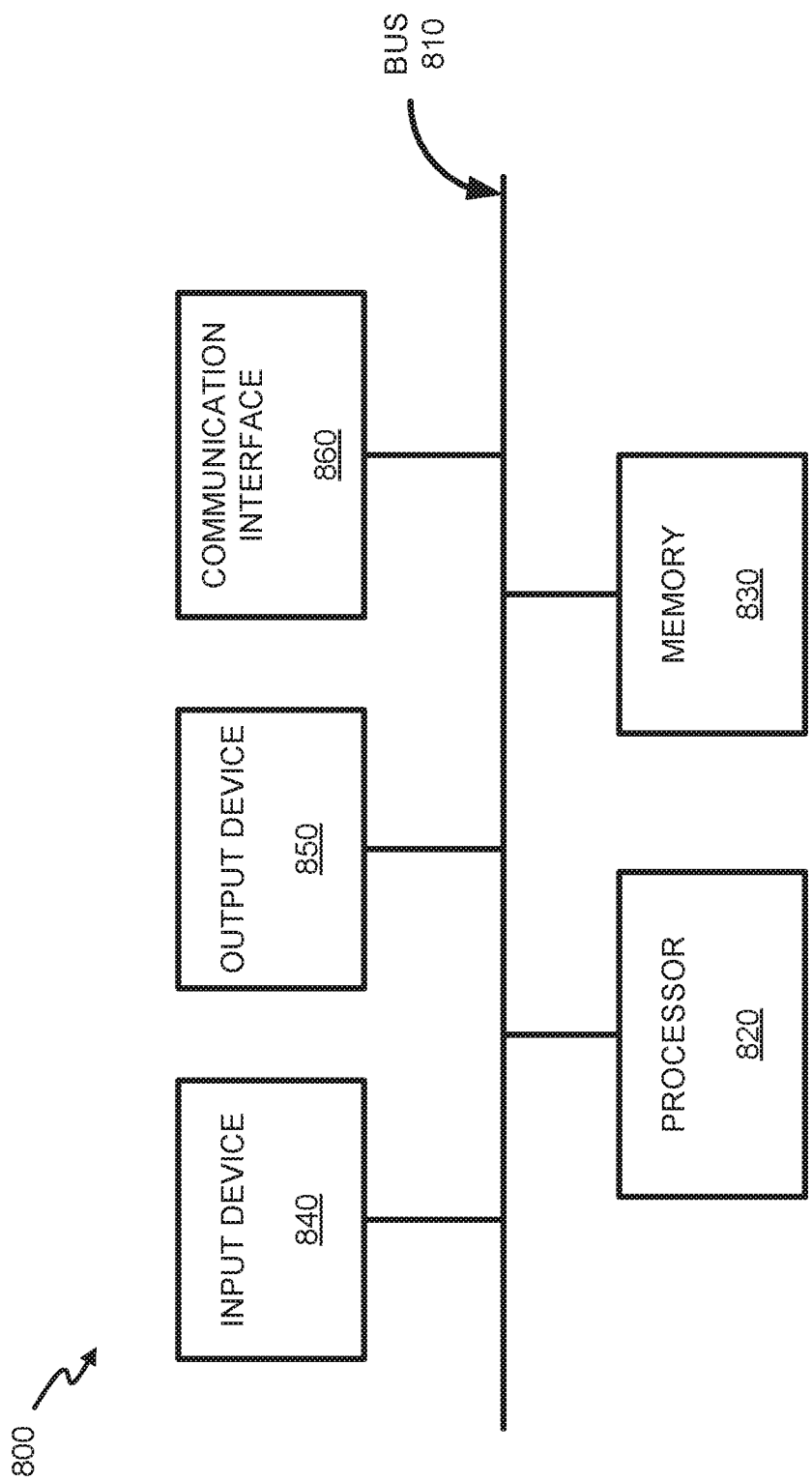
FIG. 8 is a diagram of exemplary components that may be included in one or more of the devices shown in FIG. 1.

FIG. 8 is a diagram illustrating example components of a device 800 according to an implementation described herein. End device 110, gNB 120, gNB 125, network device 150, network device 155, and other devices in network environment 100 may each be implemented in one or more devices 800. As shown in FIG. 8, device 800 may include a bus 810, a processor 820, a memory 830, an input device 840, an output device 850, and a communication interface 860.

Bus 810 may include a path that permits communication among the components of device 800. Processor 820 may include any type of single-core processor, multi-core processor, microprocessor, latch-based processor, and/or processing logic (or families of processors, microprocessors, and/or processing logics) that interprets and executes instructions. In other embodiments, processor 820 may include an application-specific integrated circuit (ASIC), a field-programmable gate array (FPGA), and/or another type of integrated circuit or processing logic.

Memory 830 may include any type of dynamic storage device that may store information and/or instructions, for execution by processor 820, and/or any type of non-volatile storage device that may store information for use by processor 820. For example, memory 830 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 840 may allow an operator to input information into device 800. Input device 840 may include, for example, a keyboard, a mouse, a pen, a microphone, a remote control, an audio capture device, an image and/or video capture device, a touch-screen display, and/or another type of input device. In some embodiments, device 800 may be managed remotely and may not include input device 840. In other words, device 800 may be "headless" and may not include a keyboard, for example.

Output device 850 may output information to an operator of device 800. Output device 850 may include a display, a printer, a speaker, and/or another type of output device. For example, device 800 may include a display, which may include a liquid-crystal display (LCD) for displaying content to the customer. In some embodiments, device 800 may be managed remotely and may not include output device 850. In other words, device 800 may be "headless" and may not include a display, for example.

Communication interface 860 may include a transceiver that enables device 800 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 860 may include a transmitter that converts baseband signals to radio frequency (RF) signals and/or a receiver that converts RF signals to baseband signals. Communication interface 860 may be coupled to an antenna for transmitting and receiving RF signals.

Communication interface 860 may include a logical component that includes input and/or output ports, input and/or output systems, and/or other input and output components that facilitate the transmission of data to other devices. For example, communication interface 860 may include a network interface card (e.g., Ethernet card) for wired communications and/or a wireless network interface (e.g., a Wi-Fi, LTE, etc.) card for wireless communications. Communication interface 860 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described above, device 800 may perform certain operations relating to implementing a private network ID for a 5G NR RAN. Device 800 may perform these operations in response to processor 820 executing software instructions contained in a computer-readable medium, such as memory 830. A computer-readable medium may be defined as a non-transitory memory device. A memory device may be implemented within a single physical memory device or spread across multiple physical memory devices. The software instructions may be read into memory 830 from another computer-readable medium or from another device. The software instructions contained in memory 830 may cause processor 820 to perform processes described herein. Alternatively, hardwired circuitry may be used in place of, or in combination with, software instructions to implement processes described herein. Thus, implementations described herein are not limited to any specific combination of hardware circuitry and software.

Although FIG. 8 shows exemplary components of device 800, in other implementations, device 800 may include fewer components, different components, additional components, or differently arranged components than depicted in FIG. 8. Additionally or alternatively, one or more components of device 800 may perform one or more tasks described as being performed by one or more other components of device 800.

Systems and methods described herein utilize 5G NR RAN architecture and NR capabilities to realize private NR networks. The private NR networks can operate in unlicensed or shared RF spectrum using 5G NR standards. A base station stores a private network identifier for a private NR RAN. The base station transmits the private network identifier within RMSI or OSI on a shared downlink channel. The private network identifier indicates support of private network operations for the private NR RAN by the base station. The base station receives, in response to transmitting the private network identifier, an attach request from an end device that is provisioned for access to the private NR RAN The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 7, and message/operation flows with respect to FIG. 6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    storing, by a base station, a first private network identifier for a first private new radio (NR) radio access network (RAN);
    transmitting, by the base station, the first private network identifier within remaining minimum system information (RMSI) or other system information (OSI) on a shared downlink channel, wherein the first private network identifier indicates support of private network operations for the first private NR RAN by the base station; and
    receiving, by the base station and based on the first private network identifier, an attach request from an end device that is provisioned for access to the first private NR RAN.

2. The method of claim 1, wherein the transmitting includes transmitting the RMSI and the OSI on a new radio physical downlink shared channel (NR-PDSCH) using a radio frequency (RF) beam of multiple RF beams supported by the base station.

3. The method of claim 1, wherein the transmitting further includes transmitting the first private network identifier using a first radio frequency (RF) downlink beam, the method further comprising:
    transmitting a second private network identifier using a second RF downlink beam.

4. The method of claim 1, wherein the transmitting includes transmitting the first private network identifier among a prioritized list comprising different private network identifiers and access restrictions for different private NR RANs associated with each of the different private network identifiers.

5. The method of claim 1, wherein the transmitting includes transmitting a second private network identifier associated with a neighboring base station.

6. The method of claim 1, wherein the transmitting includes transmitting the first private network identifier using an unlicensed or shared radio frequency (RF) spectrum and using listen-before-talk procedures.

7. The method of claim 6, wherein the transmitting further includes transmitting a synchronization sequence block (SSB), the RMSI and the OSI in consecutive orthogonal frequency-division multiplexing (OFDM) symbols.

8. The method of claim 1, further comprising:
sending, by the base station and to the end device, a request to acquire private network information from a neighboring base station; and
receiving from the end device a report including another private network identifier that is associated with the neighboring base station.

9. The method of claim 1, wherein the transmitting includes transmitting synchronization signals having a primary synchronization signal (PSS), a secondary synchronization signal (SSS), and a physical broadcast channel (PBCH) signal, wherein the PBCH signal points to the RMSI and the OSI in a time-frequency domain.

10. The method of claim 1, further comprising:
transmitting, by the base station and within the RMSI or OSI, an indication of a common RACH resource to use by end devices.

11. A base station, comprising:
one or more memories to store instructions and a first private network identifier for a first private new radio (NR) radio access network (RAN); and
one or more processors configured to execute the instructions to:
transmit the first private network identifier within remaining minimum system information (RMSI) or other system information (OSI) on a shared downlink channel, wherein the first private network identifier indicates support of private network operations for the first private NR RAN by the base station; and
receive, in response to transmitting the first private network identifier, an attach request from an end device that is provisioned for access to the first private NR RAN.

12. The base station of claim 11, wherein, when transmitting the first private network identifier, the one or more processors are further configured to execute the instructions to:
transmit the first private network identifier on a new radio physical downlink shared channel (NR-PDSCH) using a radio frequency (RF) beam of multiple RF beams supported by the base station.

13. The base station of claim 12, the one or more processors being further configured to execute the instructions to:
transmit a second private network identifier using a different RF downlink beam of the multiple RF beams supported by the base station.

14. The base station of claim 11, wherein, when transmitting the first private network identifier, the one or more processors are further configured to execute the instructions to:
transmit the first private network identifier among a prioritized list comprising different private network identifiers for different private NR RANs associated with each of the different private network identifiers.

15. The base station of claim 11, the one or more processors being further configured to execute the instructions to:
send, to the end device, a request to acquire private network information from a neighboring base station; and
receive, from the end device, a report including a second private network identifier that is associated with the neighboring base station; and
transmit, within the RMSI or OSI on the shared downlink channel, the second private network identifier associated with the neighboring base station.

16. The base station of claim 11, wherein, when transmitting the first private network identifier, the one or more processors are further configured to execute the instructions to:
transmit a synchronization sequence block (SSB), the RMSI, and the OSI in consecutive orthogonal frequency-division multiplexing (OFDM) symbols.

17. The base station of claim 11, the one or more processors being further configured to execute the instructions to:
transmit, within the RMSI or OSI, a first indication of a first RACH resource for use by end devices accessing the first private network and a second indication of a second RACH resource for use by end devices accessing a mobile network operator's (MNO) NR RAN.

18. The base station of claim 11, wherein, when transmitting the first private network identifier, the one or more processors are further configured to execute the instructions to:
transmit, on the shared downlink channel, synchronization signals having a primary synchronization signal (PSS), a secondary synchronization signal (SSS), and a physical broadcast channel (PBCH) signal, wherein the PBCH signal points to the RMSI and the OSI in an orthogonal frequency-division multiplexing (OFDM) domain.

19. A non-transitory computer-readable medium containing instructions executable by at least one processor of a base station to cause the at least one processor to:
store, in the base station, a first private network identifier for a first private new radio (NR)
transmit, by the base station, the first private network identifier within remaining minimum system information (RMSI) or other system information (OSI) on a shared downlink channel, wherein the first private network identifier indicates support of private network operations for the first private NR RAN by the base station; and
receive, by the base station and based on the first private network identifier, an attach request from an end device that is provisioned for access to the first private NR RAN.

20. The non-transitory computer-readable medium of claim 19, wherein the instructions to transmit the first private network identifier further comprise one or more instructions to cause the at least one processor to:
transmit the RMSI and the OSI on a new radio physical downlink shared channel (NR-PDSCH) using a radio frequency (RF) beam of multiple RF beams supported by the base station.

* * * * *